United States Patent
Baum et al.

(10) Patent No.: US 10,399,568 B2
(45) Date of Patent: Sep. 3, 2019

(54) METHOD AND DEVICE FOR AUTOMATIC LONGITUDINAL DYNAMICS CONTROL OF A MOTOR VEHICLE

(71) Applicant: WABCO GmbH, Hannover (DE)

(72) Inventors: Mathias Baum, Hannover (DE); Karsten Breuer, Lauenau (DE); Stephan Kallenbach, Hannover (DE)

(73) Assignee: WABCO GMBH, Hannover (DE)

( * ) Notice: Subject to any disclaimer, the term of this patent is extended or adjusted under 35 U.S.C. 154(b) by 445 days.

(21) Appl. No.: 14/903,084

(22) PCT Filed: Jun. 4, 2014

(86) PCT No.: PCT/EP2014/001516
§ 371 (c)(1),
(2) Date: Jan. 6, 2016

(87) PCT Pub. No.: WO2015/003766
PCT Pub. Date: Jan. 15, 2015

(65) Prior Publication Data
US 2016/0185349 A1 Jun. 30, 2016

(30) Foreign Application Priority Data
Jul. 12, 2013 (DE) .......... 10 2013 011 624

(51) Int. Cl.
*B60W 30/16* (2012.01)
*B60W 10/06* (2006.01)
(Continued)

(52) U.S. Cl.
CPC ............ *B60W 30/16* (2013.01); *B60W 10/04* (2013.01); *B60W 10/06* (2013.01); *B60W 10/18* (2013.01);
(Continued)

(58) Field of Classification Search
CPC .......................... B60W 301/14; B60W 301/16
See application file for complete search history.

(56) References Cited

U.S. PATENT DOCUMENTS

| 5,375,060 A | 12/1994 | Nocker |
| 2004/0041471 A1* | 3/2004 | Hellmann .......... B60K 31/0008 303/191 |

(Continued)

FOREIGN PATENT DOCUMENTS

| DE | 42 09 060 A1 | 9/1993 |
| DE | 10 2004 013 655 A1 | 11/2004 |
| DE | 10 2010 055 373 A1 | 6/2012 |
| EP | 1 053 903 A2 | 11/2000 |

*Primary Examiner* — Imran K Mustafa
(74) *Attorney, Agent, or Firm* — Leydig, Voit & Mayer, Ltd.

(57) ABSTRACT

Automatically controlling the longitudinal dynamics of a vehicle includes ascertaining a state variable dependent on the state of at least one wheel brake, detecting overshoots and/or undershoots of a limiting value of the state variable, ascertaining information about a vehicle traveling ahead, setting at least one control of a feedback control system, and controlling the longitudinal dynamics of the vehicle as a function of the at least one control parameter. A sensing device used to ascertain the state of the at least one wheel brake, another sensing device is used to ascertain information about the vehicle traveling ahead, and an evaluating, setting and controlling unit is used to evaluate the state of the at least one wheel brake and the information about the vehicle traveling ahead for setting the at least one control parameter and for controlling the longitudinal dynamics of the vehicle as a function thereof.

20 Claims, 4 Drawing Sheets

(51) Int. Cl.
  *B60W 10/184*  (2012.01)
  *B60W 10/196*  (2012.01)
  *B60W 40/076*  (2012.01)
  *B60W 10/04*   (2006.01)
  *B60W 10/18*   (2012.01)

(52) U.S. Cl.
  CPC ........ *B60W 10/184* (2013.01); *B60W 10/196* (2013.01); *B60W 40/076* (2013.01); *B60W 2510/0657* (2013.01); *B60W 2510/18* (2013.01); *B60W 2510/182* (2013.01); *B60W 2520/105* (2013.01); *B60W 2550/142* (2013.01); *B60W 2550/30* (2013.01); *B60W 2550/302* (2013.01); *B60W 2550/308* (2013.01); *B60W 2720/10* (2013.01); *B60W 2720/106* (2013.01); *B60W 2750/308* (2013.01)

(56) References Cited

U.S. PATENT DOCUMENTS

| | | | |
|---|---|---|---|
| 2004/0195022 A1 | 10/2004 | Inoue | |
| 2005/0143895 A1* | 6/2005 | Kato | B60K 31/0008 |
| | | | 701/96 |
| 2011/0276246 A1 | 11/2011 | Kuze | |
| 2012/0065863 A1 | 3/2012 | Takagi et al. | |
| 2016/0075237 A1* | 3/2016 | Zhang | B60L 15/20 |
| | | | 701/22 |

\* cited by examiner

METHOD AND DEVICE FOR AUTOMATIC LONGITUDINAL DYNAMICS CONTROL OF A MOTOR VEHICLE

FIELD OF THE INVENTION

The invention generally relates to automatic control of longitudinal dynamics of a motor vehicle, such as a commercial vehicle.

BACKGROUND OF THE INVENTION

Methods and devices of the general type under consideration are used in commercial vehicles for spacing-control systems and speed-control systems that set a speed value or acceleration value as a function of the vehicle traveling ahead. These feedback control systems are also designated as spacing/speed controllers or automatic distance regulators (ADR), in which connection the expression "adaptive cruise control" (ACC) has also gained acceptance for such feedback control.

Adaptive spacing-control and speed-control systems are capable of accessing the braking system and/or the engine management system, so that by accelerating and/or decelerating the vehicle a desired target spacing from the vehicle traveling ahead can be adjusted automatically. Consequently, the general driving safety is enhanced by maintaining a sufficient distance from the vehicle traveling ahead, and the brake wear and hence also the vehicle breakdown-times are reduced.

Such feedback control systems are advantageous when monotonous driving maneuvers, which can lead to fatigue and consequently to a reduced ability of the vehicle driver to react, have to be performed over and beyond a relatively long period. Monotonous and tiring driving maneuvers frequently have to be performed in the course of transportation journeys involving commercial vehicles, or in the course of driving urban buses or tour coaches.

DE 10 2010 055 373 A1 describes a method for controlling longitudinal dynamics of a motor vehicle in accordance with an adaptive spacing-control or speed-control system.

Longitudinal-dynamics behavior of a motor vehicle regulated by ACC is greatly dependent on environmental influences such as the inclination of the road or the wind conditions, for example. Accordingly, in the case of conventional feedback control systems, it can be observed that during level travel in succession a high degree of ride comfort can be guaranteed, and the desired headway from the vehicle traveling ahead can be maintained satisfactorily. However, if, as a consequence of inclination of the road during travel downhill, the vehicle undergoes an additional acceleration that is not dependent on the drive torque of the engine, the feedback control system can no longer maintain the high degree of ride comfort, and/or the set or desired spacing from the vehicle traveling ahead can no longer be maintained. Undershooting the desired headway can result in a sudden and strong braking intervention of the feedback control system, or the driver may feel compelled by subjective sensation to intervene by braking, resulting in further discomfort. Consequently, known systems can also be set such that a high degree of ride comfort is guaranteed during travel on an incline; however, this is at the expense of maintaining comfort during level travel.

There is therefore a need for an adaptive spacing-control or speed-control system that can be put into effect economically and that guarantees a high level of comfort and sufficient headways both in the course of level travel and during travel downhill.

SUMMARY OF THE INVENTION

Generally speaking, it is an object of the present invention to provide a method and a device that detect the presence of environmental influences that influence feedback control, and that adapt the feedback control to these environmental influences in order to guarantee a high degree of comfort and sufficient headways during travel in succession, regardless of the environmental influences. This object can be achieved by setting at least one control parameter of the vehicle feedback control system based on a number of overshoots and/or undershoots of a limiting value of a first state variable (based on the state of at least one wheel brake of the vehicle) within a defined period and on information about the vehicle traveling ahead.

This leverages the insight that a characteristic braking response occurs during relatively long journeys on an incline or journeys downhill using longitudinal-dynamics control systems, if the vehicle is additionally accelerated by reason of traveling downhill, so that the spacing from the vehicle traveling ahead is significantly reduced, for a few seconds a strong deceleration of the vehicle occurs. This strong first deceleration is followed by a phase in which the vehicle, where appropriate deploying retarders, rolls freely. During the free rolling, the vehicle rapidly closes on the vehicle traveling ahead by reason of the additional acceleration of the vehicle caused by the inclination of the roadway, again resulting in a strong deceleration of the vehicle in a next step. If the braking maneuvers triggered by the feedback control system lead to a number of overshoots and/or undershoots of the limiting value of the first state variable, it is recognized that environmental influences are acting on the vehicle that result in an additional acceleration of the vehicle.

With the information about the vehicle traveling ahead, it can furthermore be ascertained whether the spacing from the vehicle traveling ahead has to be increased or decreased in order to attain the set target spacing from the vehicle traveling ahead. If external influences that result in an acceleration of the vehicle are acting on the vehicle and if, at the same time, it is ascertained using the information about the traveling vehicle traveling ahead that the spacing from the vehicle traveling ahead has to be increased, this situation can be reacted to with a setting or adaptation of the control parameter of the feedback control system, in order that the control behavior is not negatively influenced by the external influences on the vehicle. Depending on the control parameter that has been matched to the external influences, the longitudinal dynamics of the vehicle can consequently be controlled.

In a first embodiment of the method according to the present invention, setting the at least one control parameter of the feedback control system is dependent on the detection of two, three, four or five overshoots and/or undershoots of the limiting value of the first state variable within a period between about 15 seconds and 120 seconds and on the ascertained information about the vehicle traveling ahead. Preferably, setting the control parameter is dependent on the detection of three overshoots of the limiting value of the first state variable within a period of about 60 seconds or within a period of less than 60 seconds and on the ascertained information about the vehicle traveling ahead.

In the case of three overshoots within 60 seconds, or less than 60 seconds, it can be assumed that environmental influences are acting on the vehicle that result in an additional acceleration of the vehicle, so that an adaptation of the control parameter, and consequently of the feedback control, to the environmental influences can be undertaken in order to ensure continued ride comfort and maintenance of satisfactory spacing from the vehicle traveling ahead.

In another embodiment of the method according to the present invention, the detection of a number of overshoots and/or undershoots of the limiting value of the first state variable within the defined, period is undertaken by evaluating a stored history of the first state variable. The stored history includes the temporal progression of the first state variable. The history or progression of the first state variable can for example, be queried with an evaluation routine such that the existence of a number of overshoots and/or undershoots can be detected.

In a further embodiment, the detection of a number of overshoots and/or undershoots of the limiting value of the first state variable within the defined period is undertaken using a counting unit. Upon reaching a number of overshoots and/or undershoots, the counting unit generates a signal and/or resets itself to zero if no overshoot and/or undershoot occurs within a defined period after a preceding overshoot and/or undershoot. The use of a counting unit simplifies the process further, since the recording and storage of the history or progression of the first state variable is not necessary.

Another embodiment includes the steps of detecting at least one period between overshoots and/or undershoots of the limiting value of the first state variable, preferably between two, three, four or five overshoots and/or undershoots, and ascertaining overshoots of a defined time limit of the period or periods between the overshoots and/or undershoots. The setting of the control parameter of the feedback control system in this embodiment is also dependent on the overshoots of the defined time limit of the period or periods between the overshoots and/or undershoots. Longitudinal-dynamics control systems that are capable of accessing the braking system of the vehicle strive for compliance with a time limit between the initiation of braking maneuvers, in order to prevent fading that is, the impairment of the braking performance by reason of inadequate cooling.

Ascertaining information about the vehicle traveling ahead can include determining the speed and/or acceleration of the vehicle traveling ahead and/or the actual spacing from the vehicle traveling ahead. In particular, RADAR sensors or LIDAR systems can be employed for the purpose of ascertaining information about the vehicle traveling ahead. However, it should be appreciated that further types of sensors—e.g., based on the measurement of transit-time—can also be used.

In a further embodiment of the method according to the present invention, ascertaining the first state variable dependent on the state of at least one wheel brake includes determining a brake pressure, a braking torque, a braking force, the acceleration of the vehicle and/or the speed of the vehicle. Alternatively, the first state variable may be the brake pressure, the braking torque, the braking force, the acceleration of the vehicle and/or the speed of the vehicle itself.

The first state variable dependent on the state of at least one wheel brake can also be ascertained, for example, by integration or differentiation of a directly ascertained variable. In this way, inferences can also be drawn about the temporal progression of the ascertained variable, for example by means of a brake-pressure gradient, a braking-force gradient, a gradient of the acceleration of the vehicle, and/or a gradient of the speed of the vehicle.

Another embodiment of the method according to the present invention includes the step of deriving information about the inclination state of the vehicle as a function of the first state variable. Preferably, the derivation of information about the inclination state of the vehicle is undertaken as a function of the overshoots and/or undershoots of the limiting value of the first state variable and as a function of the overshoots of the defined time limit of the period or periods between the overshoots and/or undershoots. In this case, on the basis of the first state variable it can either be concluded that a definite limiting value of the inclination of the roadway or of the vehicle has been exceeded, or by means of a calculation method the exact instantaneous value of the inclination of the roadway and/or of the vehicle can be ascertained.

In a further embodiment, controlling the longitudinal dynamics of the vehicle as a function of the control parameter includes accelerating and/or decelerating of the vehicle. This means that the feedback control system can access the braking system of the vehicle and also the engine management system order to generate an additional braking torque and/or drive torque, depending on the situation.

In another embodiment, the method according to the present invention includes the steps of defining a target spacing from the vehicle traveling ahead, ascertaining an actual spacing from the vehicle traveling ahead, and comparing the ascertained actual spacing with the defined target spacing.

The control parameter increases and/or decreases as a function of the ascertained information about the vehicle traveling ahead and as a function of detecting a number of overshoots and/or undershoots of the limiting value of the first state variable within the defined period and/or as a function of the overshoots of the defined time limit of the period, or periods between the overshoots and/or undershoots. The increase or decrease of the control parameter is preferably independent of the magnitude of the overshoots and/or undershoots of the limiting value of the first state variable, and/or of the overshoots of the defined time limit, but increases or decreases so long as the overshoots and/or undershoots of the limiting value of the first state variable and/or the overshoots of the defined time limit are present.

According to embodiments of the present invention, the control parameter does not exceed a maximum value and does not fall below a minimum value. Preferably, the control parameter remains constant upon reaching the maximum value or the minimum value if the target spacing from the vehicle traveling ahead is greater than the actual spacing therefrom and a number of overshoots and/or undershoots of the limiting value of the first state variable within the defined period are detected, and/or overshoots of the defined time limit of the period or periods between the individual overshoots and/or undershoots of the limiting value are present. By restricting the control parameter to a defined range of values, the feedback control is, for example, prevented from hardening in extreme fashion during sustained travel downhill, since the control parameter influencing the feedback control has increased to an extremely large value.

In a preferred embodiment, the control parameter increases and/or decreases linearly, non-linearly and/or in accordance with a defined function if the target spacing is greater than the actual spacing from the vehicle traveling ahead and the number of overshoots and/or undershoots of the limiting value of the first state variable within the defined period is detected, and/or overshoots of the defined time limit of the period or periods between the individual overshoots and/or undershoots of the limiting value are present. The determination of the control parameter is accordingly not undertaken as a function of the magnitude of the overshoots and/or undershoots of the limiting value, and/or of the magnitude of the overshoots of the defined time limit of the period or periods between the individual overshoots and/or undershoots of the limiting value. Rather, the control parameter increases, in accordance with one of the functions designated above, with continual existence of a number of overshoots and/or undershoots of the limiting value of the first state variable and/or with continual overshoots of the defined time limit of the period or periods between the individual overshoots and/or undershoots of the limiting value, or declines with these if the target spacing from the vehicle traveling ahead is greater than the actual spacing.

In a further embodiment, the control parameter of the feedback control system is an amplification factor, in this embodiment, a difference in speed from the vehicle traveling ahead is determined as is a target acceleration of the vehicle as a function of the ascertained difference in speed from the vehicle traveling ahead and the set amplification factor. The target acceleration in this case is dependent on an amplified difference in speed from the vehicle traveling ahead, the amplification of the difference in speed from the vehicle traveling ahead being dependent on the amplification factor, and/or the desired acceleration being a function of the ascertained difference in speed and of the amplification factor. Accordingly, it may happen, for example, that the amplification factor is constant during level travel and changes during travel downhill and/or during travel on an incline, preferably, increases up to a maximum value with sustained travel downhill and/or travel on an incline. Should one of the overshoots and/or undershoots of the limiting value no longer be present, the amplification factor can either be reset directly to the constant value or lowered to this value steadily or in accordance with a function.

A further embodiment includes the step of determining the instantaneous mass of the vehicle. Preferably, setting the at least one control parameter of the feedback control system is also dependent on the mass of the vehicle. In particular, the mass of the vehicle can have an influence on the defined limiting values, the overshoots and/or undershoots of which can be detected. Consequently, it can be guaranteed that the inventive method can be used for controlling various types of vehicle. For example, the feedback control system can react to the current loading state by taking the mass of the vehicle into consideration.

A device for longitudinal dynamics control of a vehicle according to an embodiment of the present invention includes an evaluating, setting and controlling unit is configured to set the at least one control parameter in a manner depending on a number of overshoots and/or undershoots of the limiting value of the first state variable within a defined period and on the ascertained information about the vehicle traveling ahead.

A first sensing device for ascertaining the state of the at least one wheel brake of the vehicle may be, for ample, a torque-sensing element based on strain gauges, or a different torque-sensing element, an acceleration sensor or speed sensor, a brake-pressure sensor or a rotational-speed sensor. A second sensing device can be a RADAR system, a LIDAR system, photomixing detectors (PMD sensors) or an ultrasound system.

According to an embodiment of the present invention, the evaluating, setting and controlling unit includes a memory unit and/or a counting unit designed to detect the number of overshoots and/or undershoots of the limiting value of the first state variable within the defined period.

In a further embodiment, the evaluating, setting and controlling unit is configured to detect a period or periods between overshoots and/or undershoots of the limiting value of the first state variable, preferably, between two, three, four or five overshoots and/or undershoots, and/or to ascertain overshoots of a defined time limit of the period or periods between the overshoots and/or undershoots of the limiting value.

Still other objects and advantages of the present invention will in part be obvious and will in part be apparent from the specification.

The present invention accordingly comprises the features of construction, combination of elements, and arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in more detail below with reference to the accompanying drawing figures, in which.

Figure 1:
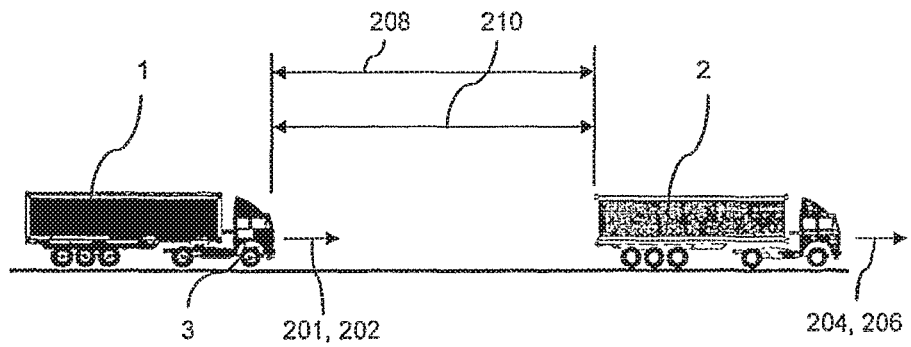
FIG. 1 illustrates a vehicle that is controlled with respect to longitudinal dynamics during level travel in succession behind a vehicle traveling ahead.

LIST OF REFERENCE CHARACTERS 1 motor vehicle
2 vehicle traveling ahead
3 device for controlling longitudinal dynamics
4a, 4b, 4c, 4d wheel brakes
6 first sensing device
8 second sensing device
10 evaluating, setting and controlling unit
12 memory unit
14 counting unit
100 define a target spacing from the vehicle traveling ahead
102 ascertain a first state variable dependent on the state of at least one wheel brake
104 ascertain information about a vehicle traveling ahead
106 ascertain an actual spacing from the vehicle traveling ahead
108 compare the ascertained actual spacing from the vehicle traveling ahead with the defined target spacing from the vehicle traveling ahead
110 detect at least one period between the overshoots and/or undershoots of a limiting value of the first state variable
112 detect overshoots and/or undershoots of a limiting value of the first state variable 114 detect a number of overshoots and/or undershoots of a limiting value of the first state variable within a defined period 116 ascertain overshoots of a defined time limit of the at least one period between the individual overshoots and/or undershoots of a limiting value of the first state variable 120 set at least one control parameter of the feedback control system 122 derive information about the inclination state of the vehicle as a function of the first state variable 130 control the longitudinal dynamics of the vehicle as a function of the at least one control parameter 201 speed of the vehicle 202 acceleration of the vehicle 204 speed of the vehicle traveling ahead 206 acceleration of the vehicle traveling ahead 208 target spacing from the vehicle traveling ahead 210 actual spacing from the vehicle traveling ahead 212 angle of inclination, of the roadway 300 control parameter 310 first state variable 312 limiting value of the first state variable 320 time 321-329 times

DETAILED DESCRIPTION OF THE PREFERRED EMBODIMENTS

FIG. 1 shows a motor vehicle 1 that is controlled with respect to longitudinal dynamics driving in succession behind a vehicle 2 traveling ahead on level roadway. Motor vehicle 1 is moving with a speed 201 and with an acceleration 202 behind vehicle 2 traveling ahead, which is moving with a speed 204 and with an acceleration 206. Motor vehicle 1 includes a device 3 for controlling longitudinal dynamics of vehicle 1, which is able to accelerate and decelerate vehicle 1 as a function of a number of overshoots and/or undershoots of a limiting value of the state of the wheel brakes within a defined period and as a function of ascertained information about the vehicle traveling ahead. During level travel, no environmental influences are acting on vehicle 1 that would necessitate an adaptation of the feedback control that has been matched to level travel. During level travel, the feedback control system is capable of guaranteeing a high degree of control comfort and, at the same time, of maintaining the desired target spacing 208 from vehicle 2 traveling ahead with a satisfactory tolerance, so that the actual spacing 210 from vehicle 2 traveling ahead corresponds substantially to the set target spacing 208 from vehicle 2 traveling ahead.

Figure 2:
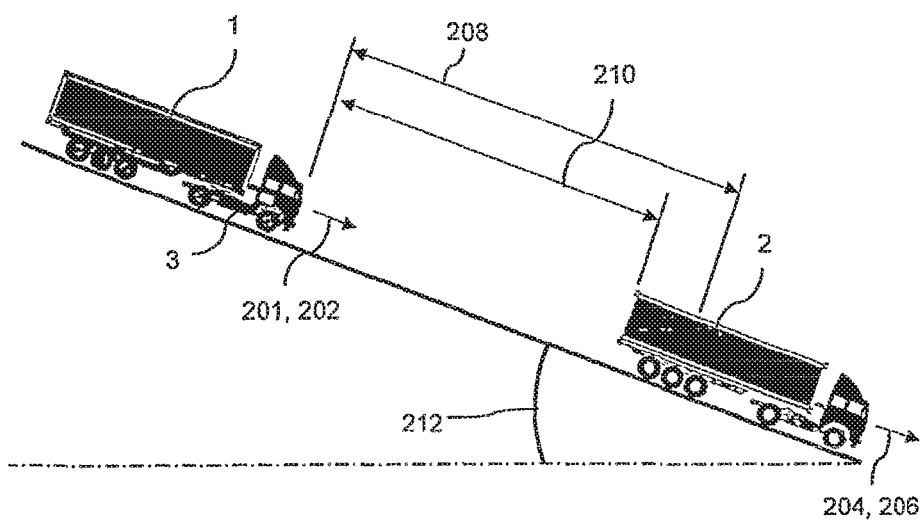
FIG. 2 illustrates a vehicle that is controlled with respect to longitudinal dynamics during travel in succession behind a vehicle traveling ahead on an inclined section.

Referring to FIG. 2, because vehicle 1 is traveling on a roadway that is inclined by angle 212, an additional acceleration of vehicle 1 occurs that is not brought about by the drive torque of the vehicle's engine. The acceleration 202 and also the speed 201 of vehicle 1 are consequently increased. If the speed 204 and/or the acceleration 206 of vehicle 2 traveling ahead remain(s) constant, the set target spacing 208 from vehicle 2 traveling ahead is no longer maintained. Consequently, the actual spacing 210 from vehicle 2 traveling ahead is less than the set target spacing 208. If for example, three overshoots of a limiting value of the state of the wheel brakes within about 60 seconds are established, there is a need to adapt the feedback control to the environmental influences. This is done by setting the control parameter as a function of the three overshoots of the limiting value within 60 seconds and as a function of the information about vehicle 2 traveling ahead.

Figure 3:
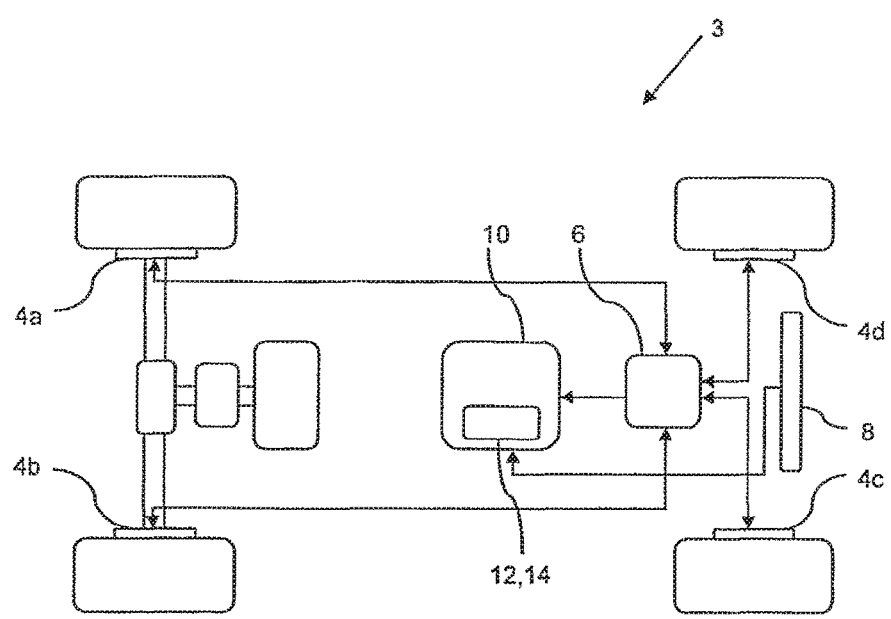
FIG. 3 is a schematic representation of an embodiment of the device for longitudinal dynamics control of a vehicle according to the present invention.

According to FIG. 3, the device for controlling the longitudinal dynamics of the vehicle 3 includes a first sensing device 6 for ascertaining the state of the four wheel brakes 4a, 4b, 4c, 4d, a second sensing device 8 for ascertaining information about a vehicle traveling ahead, and an evaluating, setting and controlling unit 10 for evaluating the state of the four wheel brakes 4a, 4b, 4c, 4d and for evaluating the information about the vehicle traveling ahead, for setting at least one control parameter, and for controlling the longitudinal dynamics of the vehicle as a function of the at least one control parameter.

The evaluating, setting and controlling unit 10 is configured to set a control parameter in a manner depending on three overshoots of a limiting value of the state, of the four wheel brakes 4a, 4b, 4c, 4d within 60 seconds and on the ascertained information about vehicle 2 traveling ahead. Furthermore, the evaluating, setting and controlling unit 10 includes a memory unit 12 in order to detect a number of overshoots of the limiting value of the state of the wheel brakes 4a, 4b, 4c, 4d within 60 seconds. Alternatively, however, vehicle 1 can also include a counting unit 14 which can likewise detect the number of overshoots of the limiting value of the state of the wheel brakes 4a, 4b, 4c, 4d within 60 seconds. Furthermore, the evaluating, setting and controlling unit 10 can ascertain overshoots of a defined time limit of the period or periods between the overshoots of the limiting value of the state of the wheel brakes 4a, 4b, 4c, 4d.

Figure 4:
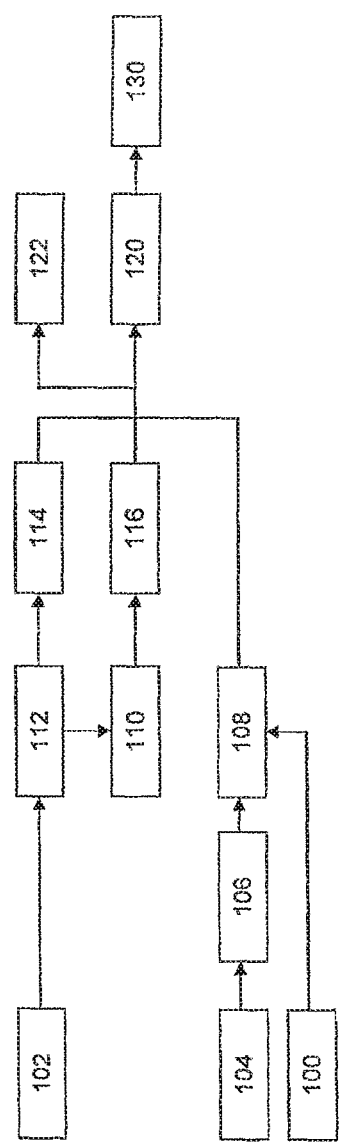
FIG. 4 is a flow chart illustrating an embodiment of the method according to the present invention for automatic control of longitudinal dynamics of a motor vehicle.

FIG. 4 is a flow chart illustrating a method for automatic control of longitudinal dynamics of a motor vehicle according to an embodiment of the present invention. The method includes the steps of ascertaining 102 a first state variable dependent on the state of at least one wheel brake, ascertaining 112 overshoots and/or undershoots of the limiting value of the first state variable, and detecting 114 a number of overshoots and/or undershoots of the limiting value within a defined period.

Furthermore, the method includes the steps of detecting 110 at least one period between the overshoots and/or undershoots of the limiting value of the first state variable, preferably, between two, three, four or five overshoots and/or undershoots. On the basis of the ascertained period or periods between the individual overshoots and/or undershoots of the limiting value of the first state variable, in the step of ascertaining 116 overshoots of a defined time limit of the period or periods between the individual overshoots and/or undershoots of a limiting value of the first state variable, it can now be ascertained whether the overshoots and/or undershoots follow one another rapidly in such a manner that it can be assumed that the cooling-time of the braking system that is necessary for avoiding fading was undershot.

The method further includes the steps of ascertaining 104 information about a vehicle traveling ahead and ascertaining 106 an actual spacing from the vehicle traveling ahead. A target spacing from the vehicle traveling ahead, defined by step 100, is compared with the actual spacing from the vehicle traveling ahead in step 110.

The method further includes the step of setting 120 the at least one control parameter of the feedback control system as a function of a number of overshoots and/or undershoots of the limiting value of the first state variable within a defined period and as a function of the overshoots of the defined time bruit of the period or periods between the individual overshoots and/or undershoots of the limiting value.

Furthermore, the method includes the step of deriving 122 information about the inclination state of the vehicle as a function of the first state variable, in particular as a function of the overshoots and/or undershoots of the limiting value of the first state variable and/or as a function of the overshoots of the defined time limit of the period or periods between the overshoots and/or undershoots of the limiting value. After the control parameter has been set, the step of controlling 130 the longitudinal dynamics of the vehicle as a function of the control parameter can be executed.

Figure 5:
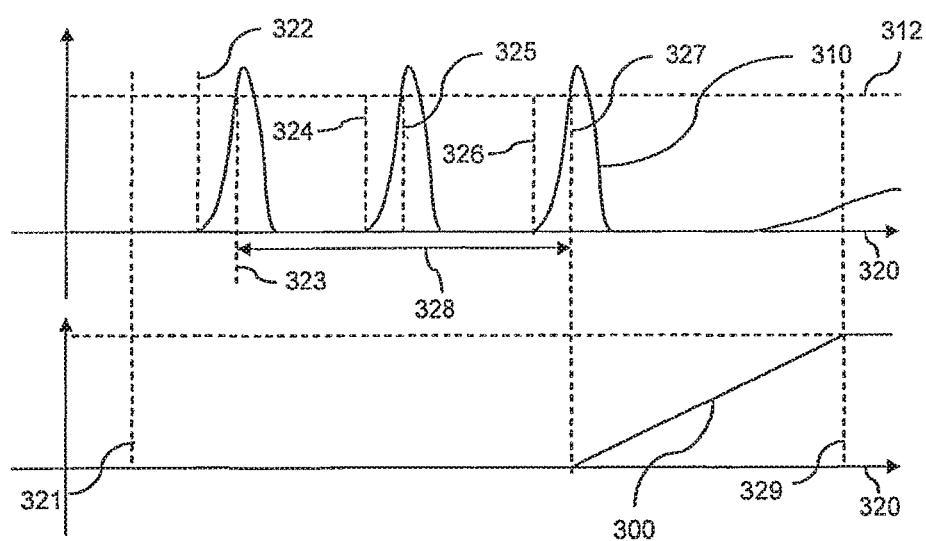
FIG. 5 is a schematic representation of the changes in the state variable and in the control parameter, plotted over time.

FIG. 5 shows the changes in the control parameter 300 and in the first slate variable 310 dependent on the state of the four wheel brakes, plotted over time 320. At time 321, the vehicle is traveling along an inclined roadway. By virtue of the inclination of the roadway, the vehicle undergoes an additional acceleration, which is independent of the drive torque of the engine. By reason of the additional acceleration, the actual spacing from the vehicle traveling ahead diminishes. At time 322, the automatic longitudinal-dynamics control system intervenes and retards the vehicle by actuating the wheel brakes that the actual spacing from the vehicle traveling ahead again increases. By reason of the now sufficient actual spacing from the vehicle traveling ahead, the braking intervention is canceled, so that the vehicle again closes on the vehicle traveling ahead. At times 324 and 326, the wheel brakes are actuated again, in order to increase the spacing from the vehicle traveling ahead. During the three braking maneuvers, which were initiated at times 322, 324 and 326, in each instance an overshoot occurs of the limiting value 312 of the first state variable 310. The overshoots of the limiting value take place at the three times 323, 325 and 327. The period 328 between the first overshoot of the limiting value and the third overshoot of the limiting value amounts to under 60 seconds in the underlying driving situation. By reason of the rapid succession of the three overshoots of the limiting value, the feedback control system is capable of detecting that environmental factors (here, inclination of the roadway) are present that result in an additional acceleration of the vehicle. If the difference between the target spacing from the vehicle traveling ahead and the actual spacing from the vehicle traveling ahead now exceeds a defined limiting value, there is a need to adapt the feedback control to the prevailing environmental influences. In order to adapt the feedback control to these environmental influences, starting from time 327 the control parameter 300 is constantly increased until at time 329 the parameter assumes a limiting value or maximum value. The maximum value of the control parameter 300 is kept constant until no overshoots of the limiting value of the first state variable 310 any longer arise within a defined period. If no overshoots of the limiting value of the first state variable 310 are detected within this period, the control parameter 300 is again lowered linearly.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for automatic longitudinal dynamics control of a vehicle comprising the steps of:
   monitoring a value of a first state variable, the first state variable being dependent on a state of at least one wheel brake of the vehicle;
   detecting overshoots and/or undershoots of a limiting value of the first state variable;
   counting a number of the detected overshoots and/or undershoots detected within a defined period of time;
   determining information about a vehicle traveling ahead of the vehicle;
   using a control unit, setting at least one control parameter of a feedback control system of the vehicle based on the number of the detected overshoots and/or undershoots counted within the defined period of time and further based on the information about the vehicle traveling ahead; and
   controlling longitudinal dynamics of the vehicle as a function of the at least one control parameter.

2. The method as claimed in claim 1, wherein the setting the at least one control parameter of the feedback control system is performed in response to counting two or more detected overshoots and/or undershoots of the limiting value of the first state variable within a time period having a duration of between about 15 seconds and 120 seconds.

3. The method as claimed in claim, 1, wherein detecting overshoots and/or undershoots of the limiting value of the first state variable is performed by evaluating a stored history of values of the first state variable.

4. The method as claimed, in claim 1, wherein counting the number of the detected overshoots and/or undershoots within the defined period of time is performed by a counting unit,
   wherein the counting unit, upon counting a threshold number of detected overshoots and/or undershoots within the defined period of time, generates a signal, and
   wherein the counting unit resets a count value to zero when no overshoot and/or undershoot occurs within the defined period of time after a previous overshoot and/or undershoot.

5. The method as claimed in claim 1, further comprising: detecting at least one period between individual, ones of the overshoots and/or undershoots; and determining overshoots of a defined time limit of the at least one period between the individual ones of the overshoots and/or undershoots; and wherein setting the at least one control parameter of the feedback control system is based on the overshoots of the defined time limit of the at least one period between the individual ones of the overshoots and/or undershoots.

6. The method as claimed in claim 1, wherein determining the information about the vehicle traveling ahead includes determining one or more of a speed of the vehicle traveling ahead, an acceleration of the vehicle traveling ahead, and an actual distance from the vehicle traveling ahead.

7. The method as claimed in claim 1, wherein monitoring the first state variable includes determining one or more of a brake pressure, a braking torque, a braking force, an acceleration of the vehicle, or a speed of the vehicle.

8. The method as claimed in claim 5, further comprising: deriving information about the inclination state of the vehicle as a function of the first state variable.

9. The method as claimed in claim 5, the at least one control parameter increases and/or decreases as a function of the information about the vehicle traveling ahead and as a function of the number of overshoots and/or undershoots within the defined period of time and/or as a function of the overshoots of the defined time limit of the periods between individual ones of the overshoots and/or undershoots.

10. The method as claimed in claim 9, wherein the at least one control parameter is less than or equal to a maximum value and/or is greater than or equal to a minimum value when a target distance from the vehicle traveling ahead is greater than the actual spacing distance from the vehicle traveling ahead, and the number of overshoots and/or undershoots within the defined period are detected, and/or the overshoots of the defined time limit of the periods between the individual ones of the overshoots and/or undershoots are present.

11. The method as claimed in claim 9, wherein the at least one control parameter increases and/or decreases linearly, non-linearly or in accordance with a defined function when the number of overshoots and/or undershoots within the defined period are detected and a target distance from the vehicle traveling ahead is greater than the actual distance from the vehicle traveling ahead, and/or the overshoots of the defined time limit of the periods between the individual ones of the overshoots and/or undershoots are present.

12. The method as claimed in claim 9, wherein the at least one control parameter is an amplification factor, and further comprising: determining a difference in speed with respect to the vehicle traveling ahead, setting the amplification factor; and determining a target acceleration of the vehicle as a function of the difference in speed with respect to the vehicle traveling ahead and the amplification factor; wherein the target acceleration depends on an amplified difference in speed with respect to the vehicle traveling ahead, wherein the amplification of the difference in speed with respect to the vehicle traveling ahead depends on the amplification factor, and/or the target acceleration is a function of the difference in speed and the amplification factor.

13. A device for longitudinal dynamics control of a vehicle, the device comprising:
   at least one first sensor configured to determine a state of at least one wheel brake of the vehicle;
   a second sensor configured to determine information about a vehicle traveling ahead of the vehicle; and
   a control unit configured to:
      (i) detect overshoots and/or undershoots of a limiting value of a first state variable being dependent on the state of the at least one wheel brake,
      (ii) evaluate the information about the vehicle traveling ahead,
      (iii) set at least one control parameter of a feedback control system of the vehicle, and
      (iv) control the longitudinal dynamics of the vehicle as a function of the control parameter; and
   wherein the control unit is configured to set the at least one control parameter of the feedback control system of the vehicle based on a number of overshoots and/or undershoots of the limiting value of the state variable counted within a defined period of time and on the information about the vehicle traveling ahead.

14. The device as claimed in claim 13, wherein the control unit includes a memory and/or a counter configured to count the number of overshoots and/or undershoots within the defined period of time.

15. The device as claimed in claim 14, wherein the control unit is configured to detect a period between individual ones of the overshoots and/or undershoots and to determine overshoots of a defined time limit of the period between the individual ones of the overshoots and/or undershoots.

16. A vehicle, comprising the device as claimed in claim 13.

17. The method as claimed in claim 2, wherein the time period has a duration of about 60 seconds or less.

18. The method as claimed in claim 8, wherein deriving information about the inclination state of the vehicle is as a function of the overshoots and/or undershoots.

19. The method as claimed in claim 8, wherein deriving information about the inclination state of the vehicle is as a function of the overshoots of the defined time limit of the periods between the individual ones of the overshoots and/or undershoots.

20. The method as claimed in claim 10, wherein the at least one control parameter remains constant upon reaching the maximum value and/or the minimum value.

* * * * *